CONDITIONAL SUM AND/OR CARRY ADDER

Filed March 25, 1965 4 Sheets-Sheet 1

INVENTOR.
LEONARD B. RUTHAZER
BY Robert J. Zinn
ATTORNEY

INVENTOR.
LEONARD B. RUTHAZER
BY Robert J. Zinn
ATTORNEY

INVENTOR.
LEONARD B. RUTHAZER
BY Robert S. Zuin
ATTORNEY

INVENTOR.
LEONARD B. RUTHAZER
BY Robert S. Zuin
ATTORNEY 3,316,393

CONDITIONAL SUM AND/OR CARRY ADDER

Leonard B. Ruthazer, Norwood, Mass., assignor to Honeywell Inc., Minneapolis, Minn., a corporation of Delaware Filed Mar. 25, 1965, Ser. No. 442,707
13 Claims. (Cl. 235—175)

The present invention relates to a new and improved method and apparatus for effecting the addition of two digitally represented numbers. More specifically, the present invention is concerned with a new and improved method for effecting the parallel, high-speed addition of binary coded numbers.

It has long been realized that the addition of a pair of operands in a simple iterative type adder comprising a plurality of cascaded full adder stages is limited by the time required to propagate a carry through successive stages of the adder. This is due to the fact that the generation of the sum and carry in any one stage is dependent on the carry propagated thereto from the preceding stage. In contrast, an appreciable increase in operating speed may be realized in a parallel adder wherein the carries are simultaneously made available to the various stages.

Of the many types of parallel adders available, the conditional sum adder is one of the fastest. The conditional sum method of performing addition is based on the computation of "conditional" sums and carries for corresponding bits of the augend and addend operands first on the assumption that a carry is propagated from the preceding stage and second on the assumption that no carry is propagated from the preceding stage. The resulting conditional sums and carries represent the assumption of all possible distributions of carries for the corresponding bits of the addend and augend operands. The true sum for each bit position is established by selecting the appropriate carry from among the conditional sums and carries in accordance with the carry actually propagated from the immediately preceding bit position.

As an improvement to the basic conditional sum type of adder, it has heretofore been proposed to arrange the addend and augend operand bits in equal length groups and generate conditional sums and carries simultaneously in all groups, a first time on the assumption that a carry was propagated into the low order bit position of each group from the preceding group, and a second time on the assumption that no carry was propagated into the low order bit position thereof; whereafter the selection of the appropriate conditional sums and carries is effected in accordance with whether a carry from the preceding group actually occurred.

It is a primary object of the present invention to provide an improved version of the basic conditional sum adder as hereinbefore described.

It is a further object to provide a faster and more efficient version of a conditional sum adder in the manner of that hereinbefore described which necessitates a minimum number of operative components.

Still another object of the present invention is to provide an improved conditional sum adder of the group type wherein the time needed to generate a carry within one digital group and propagate an indication thereof to the succeeding digital group is synchronized so as to correspond with the time required to generate and propagate carries within said succeeding digital group whereby no additional delay is encountered in effecting the selection of the correct conditional sums and carries within the adder.

A technique which exhibits the speed advantages of the conditional sum and carry adder while at the same time effecting a substantial savings in hardware is the conditional carry adder. In the conditional carry adder, the grouped addend and augend operand bits may first be examined to generate and propagate the intragroup carries. As in the conditional sum and carry adder, this carry generation and propagation is effected first on the assumption that a carry was propagated into the low order bit position of each group, and second on the assumption that no carry was propagated into the low order bit positions thereof. The identification of a correct intergroup carry is effective in initiating a transfer of the intragroup carries from the immediately succeeding group, these latter carries being thereafter combined with signals representing the corresponding addend and augend operand bits in a separate logic portion wherein the proper sum bits are produced.

It is therefore another primary object of the present invention to provide a conditional carry adder which exhibits improved operating efficiencies both with respect to hardware and time.

Another object of the present invention is to provide a conditional carry adder wherein means are provided to generate conditional carry signals for paired operand bits both on the assumption that a carry was propagated thereto and that no carry was propagated thereto; whereafter the correct carry signal is selected in accordance with the nature of the true carry signal generated in the immediately preceding bit position and combined with the corresponding paired operand bits to produce the proper sum bit.

In achieving the objects and advantages of the present invention, there is herein proposed, as one embodiment, a digital computing apparatus comprising a plurality of paired multi-stage adders combined with a single unpaired adder portion, all of which operate in a parallel mode. Input signal means are connected to respective digital positions of all of the adders for transferring signals representing the augend and addend operands thereto. The augend and addend operands are separated into multi-bit groups with the least significant bits thereof connected to the respective inputs of the unpaired adder portion. The plurality of paired adders are further characterized in that the number of stages in each adder increases for adders associated with digital positions of increased numerical significance. Associated with one of each pair of the plurality of paired adders are means for automatically forcing a carry into the low order digital position thereof; it is the function of these latter adders to represent conditional sums for the corresponding digits of the operands on the assumption that a carry was propagated thereto from the preceding adder pair. In a similar manner, the remaining ones of said paired adders generate conditional sums assuming no carry is propagated thereto from the preceding adder pair. Means are provided for representing the conditional sums and carries generated in each of the paired adders; and further means are provided which are actuated upon the generation of the true sum and carry signals in the unmatched adder to thereby effect the selection of one or the other of the conditional sums and carries associated with each of the plurality of paired adders.

The relationship of the number of bit positions in a particular one of the plurality of paired adders to the number of bit positions in the succeeding paired adders is determined by the time required to generate the conditional sums and carries in one of the paired adders, as well as to forward an indication of the selected one thereof in accordance with the propagation of the true carry from preceding adder pair. Thus, the difference in digital positions within one of the paired adders and the succeeding adder pair is such that the signal representing the selected sum and carry will arrive at the succeeding adder pair in synchronism with the generation of the conditional sum and carry signals therein to thereby insure that the resultant sum will be generated in the least time possible and in the most efficient manner.

Other embodiments are described herein in which the adders of the above-described embodiment are replaced by carry logic to thereby enable the practice of the principles of the present invention to best advantage. For a better understanding of these embodiments, their advantages and specific objects to be obtained with their use, reference should be had to the accompanying drawings and descriptive matter.

Figure 1A:
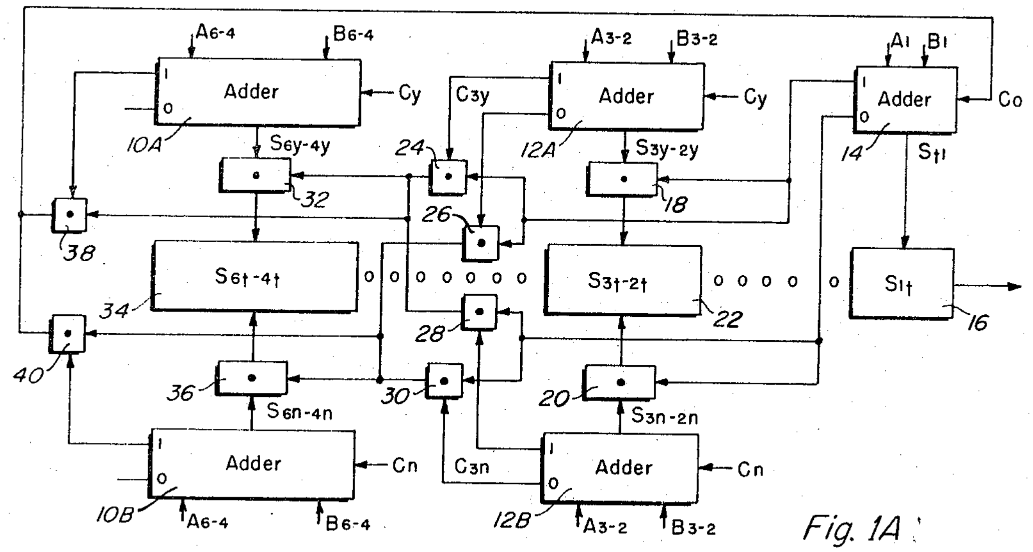
FIGURE 1A is a diagrammatic representation of a digital computing apparatus incorporating the principles of the present invention.

Referring now to FIGURE 1A, therein is disclosed a simplified version of a conditional sum adder embodying the principles of the present invention. The embodiment of FIGURE 1A is capable of effecting the parallel addition of a six-digit addend $A_{6-1}$ to a six-digit augend $B_{6-1}$ to produce a true sum $S_{6_t-1_t}$. The notations 6–1 designate the effective digital positions within the sum while the subscript *t* denotes these digits as comprising a true sum as opposed to conditional sum values to be hereinafter more fully defined. In this respect, an *n* or a *y* has been subscripted to an S or a C to indicate respectively conditional sums and carries for the designated digits as generated upon the assumption that there was no carry propagated into the low order digital position of the associated group, or on the assumption that there was a carry propagated into the low order digital position of that group.

Included in the embodiment of FIGURE 1A are a plurality of paired adders 10A and 10B, and 12A and 12B. The individual stages of the adders 10A and B, 12A and B, and of an associated unpaired adder portion 14 may be of the conventional full adder type, the actual circuitry for carrying out the full add operation being of the form disclosed in chapter 4 of the book entitled "Arithmetic Operations in Digital Computers" by R. K. Richards; D. Van Nostrand Company, Inc., New York, 1955. In the particular embodiment of FIGURE 1A, the paired adders 10A and B, and 12A and B are further characterized in that the number of digital positions therein increases in the manner of an arithmetic progression in the direction of digital positions of increased numerical significance.

Upon a full understanding of the principles of the present invention, it will become apparent that the increase in operating speed and efficiency of a system embodying these principles will be in direct proportion to the difference in the number of digital positions occurring between succeeding ones of the paired adders. More specifically, the speedup in operating time and consequent improved efficiency is achieved by taking advantage of the time required to effect the selection of a pregenerated conditional sum in accordance with the nature of the true carry propagated to that adder portion from the preceding group; and, after making the selection of the conditional sum and carry, the additional time needed to propagate the true carry to the succeeding adder portion. This selection and propagation time is utilized in the present invention to advantage by increasing the number of digital positions in successive adder portions so that when the true nature of the carry being propagated from the preceding adder portion is finally ascertained, a signal indicating this condition will be propagated forward and will arrive at the succeeding adder portion in synchronism with the conditional sums and carries generated therein.

As indicated in the embodiment of FIGURE 1A, the time required to effect the selection of the true conditional sum and carry values and to effect the propagation of the true carry therefrom may be assumed to correspond exactly with the time required to effect the generation of conditional sum and carry values for one full adder stage. Thus, an adder portion 14 generates full add signals for the corresponding digits A1 and B1 of the augend and addend operands and propagates a carry, if any, therefrom, while paired adders 12A and 12B effect the generation of conditional sum and carry signals for a pair of the augend and addend operand digits. Thus, as the carry or no-carry signal from adder 14 arrives at the gating circuitry of adders 12A and 12B, the latter are just completing the generation of conditional sum and carry values for the operand digits A2A3 and B2B3, so that the selection of the proper conditional sum and carry signals may be effected immediately thereafter without necessitating a delay thereto.

Included in the gating circuitry common to each adder pair are AND gates 18 and 20 which are respectively conditioned by the true carry and true no-carry outputs of adder 14 to alternatively permit conditional sum signals $S_{3_y-2_y}$ or $S_{3_n-2_n}$ to pass therethrough for temporary storage in a register 22, the latter register representing the true sum digits for digital positions 2 and 3. The register 16 and the logical gating structure of AND gates 18 and 20 referred to above, as well as those hereinafter referred to, may be of a conventional design such as disclosed in chapter 3 of the above-referenced book of R. K. Richards. Somewhat simultaneous with the selection and propagation of the true carry signals to the gating circuitry associated with paired adders 12A and 12B, the true value of the sum digit bit for the addition of the A1 and B1 operands is transferred to and stored in register 16.

The generation of conditional sums and carries for the fourth, fifth and sixth digits of the A and B operands occurs somewhat simultaneous with the generation, selection and propagation of sums and carries in the paired adders 12A and B, and the accompanying operation in adder 14. As soon as the nature of the true carry from adder 14 is available, an indication thereof is forwarded either to AND gates 24 and 26, or AND gates 28 and 30 in accordance with whether a carry or no-carry condition occurred. The conditioning of AND gates 24 and 26 is completed by signals representing a conditional carry generated at the output of adder portion 12A, wherein a carry or no-carry condition is generated on the assumption that a carry into the lowermost stage thereof did occur. In a similar manner, the conditioning of AND gate 28 or 30 is completed by the generation of a conditional carry at the output of adder portion 12B, wherein a carry or no-carry condition is generated on the assumption that a no-carry was propagated into the lowermost stage thereof.

AND gate 32 is provided to control the transfer of the conditional sum signals $S_{6_y-4_y}$ generated in adder portion 10A and corresponding to digits 4 through 6 of the A and B operands. In addition to signal $S_{6_y-4_y}$, the conditioning of AND gate 32 is completed by a signal from AND gate 24 or 28 indicating either that adder 14 generated a true carry which was propagated through adder portion 12A, or that adder portion 14 generated a no-carry signal but that adder portion 12B did generate a carry. Upon the satisfaction of either of these latter two conditions, AND gate 32 will effect the transfer of the signals $S_{6_y-4_y}$ to a register 34; which signals then become the true sum values for digital positions 4 through 6. Simultaneous with the generation of the conditional sum values $S_{6_y-4_y}$ in adder portion 10A, there are generated corresponding conditional sum values $S_{6_n-4_n}$ in adder portion 10B on the assumption that no-carry was propagated into the lowermost digital position thereof from the preceding paired adders. These latter values of the conditional sum signals are synchronized to arrive at AND gate 36 simultaneously with the arrival of signals from AND gates 26 and 30 provided that either a no-carry condition occurred in adder portions 14 and 12B, or that a true carry was propagated from adder portion 14 but no-carry occurred in adder portion 12A. As can be seen, the activation of AND gates 32 and 36 are mutually exclusive in that the transfer thereby of the conditional sum signals from one of the paired adders will preclude the transfer of the other during the same addition cycle.

In reviewing the operation of the apparatus embodied in FIGURE 1A, the generation of conditional sum and carry signals in the low order digital positions of adder portions 10 and 12 proceeds simultaneously with the generation of true sum and carry signals in adder portion 14. As an indication of the carry–no-carry condition is being transferred from adder portion 14, the generation of conditional sum and carry signals continues in the second lower order digital positions of adder portions 10 and 12. As the selection of the proper conditional sum and carry signals generated in paired adders 12A and B occurs, and a true carry is propagated from AND gate 24, 26, 28 or 30 to AND gate 32 or 34, the generation of conditional sum and carry signals continues in the third low order digital position of paired adders 10A and B. As indicated above, the appearance of the conditional sum signals on the output lines associated with the paired adders 10A and B occurs somewhat simultaneously with the arrival of the gating input signal to AND gate 32 or 36 so that there is no delay in the selection of the true sum signals therefrom.

The six-digit adder of FIGURE 1A may find particular use in a character-oriented machine wherein the six digits will then represent a small portion of an extended operand which may necessitate a plurality of characters to effect the complete expression thereof. Accordingly, provision is made for a true carry generated in the sixth digital position of adder portion 10A or 10B to be added to the low order digital position of the succeeding character of the associated operand. This carry is generally referred to as an end-around carry and in the embodiment of FIGURE 1A is identified as input $C_0$ to adder 14.

In an instance where the embodiment of FIGURE 1A is projected for use in a character-oriented machine, additional circuitry is needed to effect the transfer of the end-around carry $C_0$ to the input of adder portion 14. As shown, AND gate 38 is conditioned by a carry from adder portion 10A, wherein conditional sum and carry signals are generated on the assumption that a carry into the lowermost stage thereof did occur. The conditioning of AND gate 38 is completed by a signal from AND gate 24 or 28 indicating alternatively that either adder portion 14 generated a true carry which was propagated by adder portion 12A or that the adder portion 12B itself generated a true carry. In a similar manner, AND gate 40 is conditioned in part by a carry generated in adder portion 10B on the assumption that no carry into the lowermost stage thereof occurred, as well as a signal from AND gate 26 or 30 establishing that in fact no carry from the paired adders 12A or 12B occurred.

An output from either AND gate 38 or AND 40 constitutes the end-around carry which is being transferred to the end-around carry input $C_0$ of adder 14 is delayed sufficiently, by means not shown, to insure that all of the adder stages and the associated registers are cleared and that the apparatus is prepared for the next operative cycle. For a more complete understanding of a character-oriented adder and the logic associated therewith for effecting the end-around carry, reference is hereby made to the co-pending application of W. Maczko and W. Lethin, entitled Information Handling Apparatus, bearing Ser. No. 376,348, filed June 19, 1964, and assigned to the assignee of the present invention.

Figure 1B:
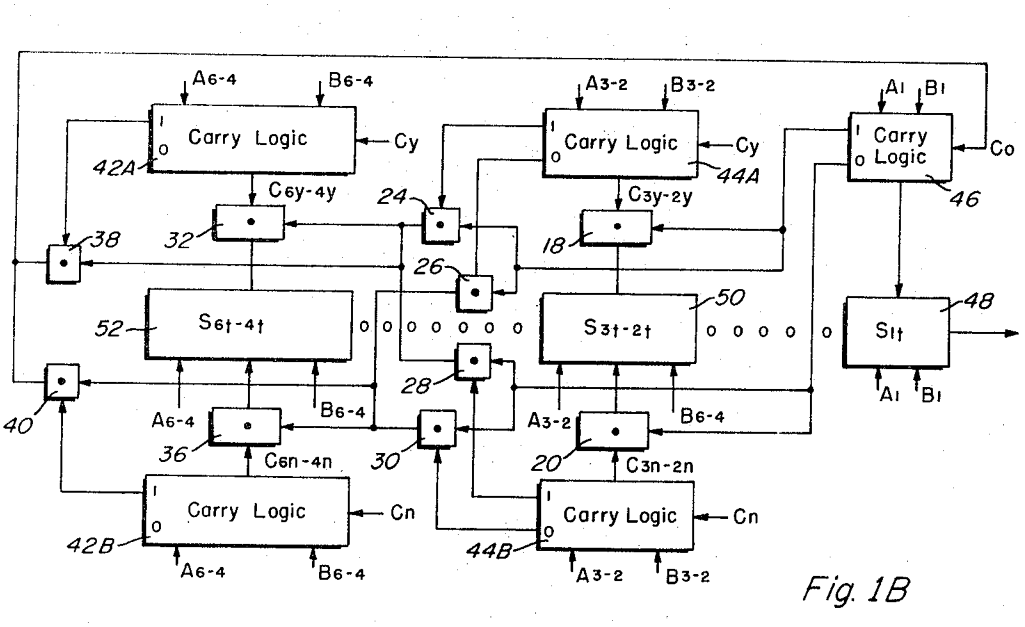
FIGURE 1B is a diagrammatic representation of another digital computing apparatus incorporating the principles of the present invention.

Reference is now made to FIGURE 1B which discloses an alternative embodiment of a character-oriented conditional carry adder exhibiting the principles of the present invention. As mentioned above, the conditional carry adder is more efficient than the conditional sum and carry adder in that with respect to hardware considerations, it is not necessary to duplicate the logic for generating the sum signals.

In comparing the embodiments of FIGURES 1A and B, it is seen that the paired adder portions 10A and B, 12A and B and the unpaired adder 14 of FIGURE 1A have been replaced by carry logic generating and propagating means 42A and B, 44A and B, and 46. The output signals from the respective carry generation and propagation portions now represent conditional carries corresponding to the digital positions therein. The conditional carries as generated in the carry logic 42A and B, and 44A and B are gated through the gating means 18, 20, 32 and 36, common to both FIGURES 1A and 1B, in accordance with the nature of the true carry as ascertained in the preceding group. The manner in which the selection of the carries occurs corresponds with the manner of selecting the conditional sum signals as was outlined above. The selected carries are gated into members 52, 50 and 48 which contain the sum logic for the respective bits. Corresponding signals for both the A and B operand bits are also gated into members 48, 50 and 52. Means are further provided in the nature of gates 38 and 40, to effect the transfer of the end-around carry to the input of carry logic 46 in a manner synonymous with that outlined above with respect to the explanation of FIGURE 1A.

Figure 2:
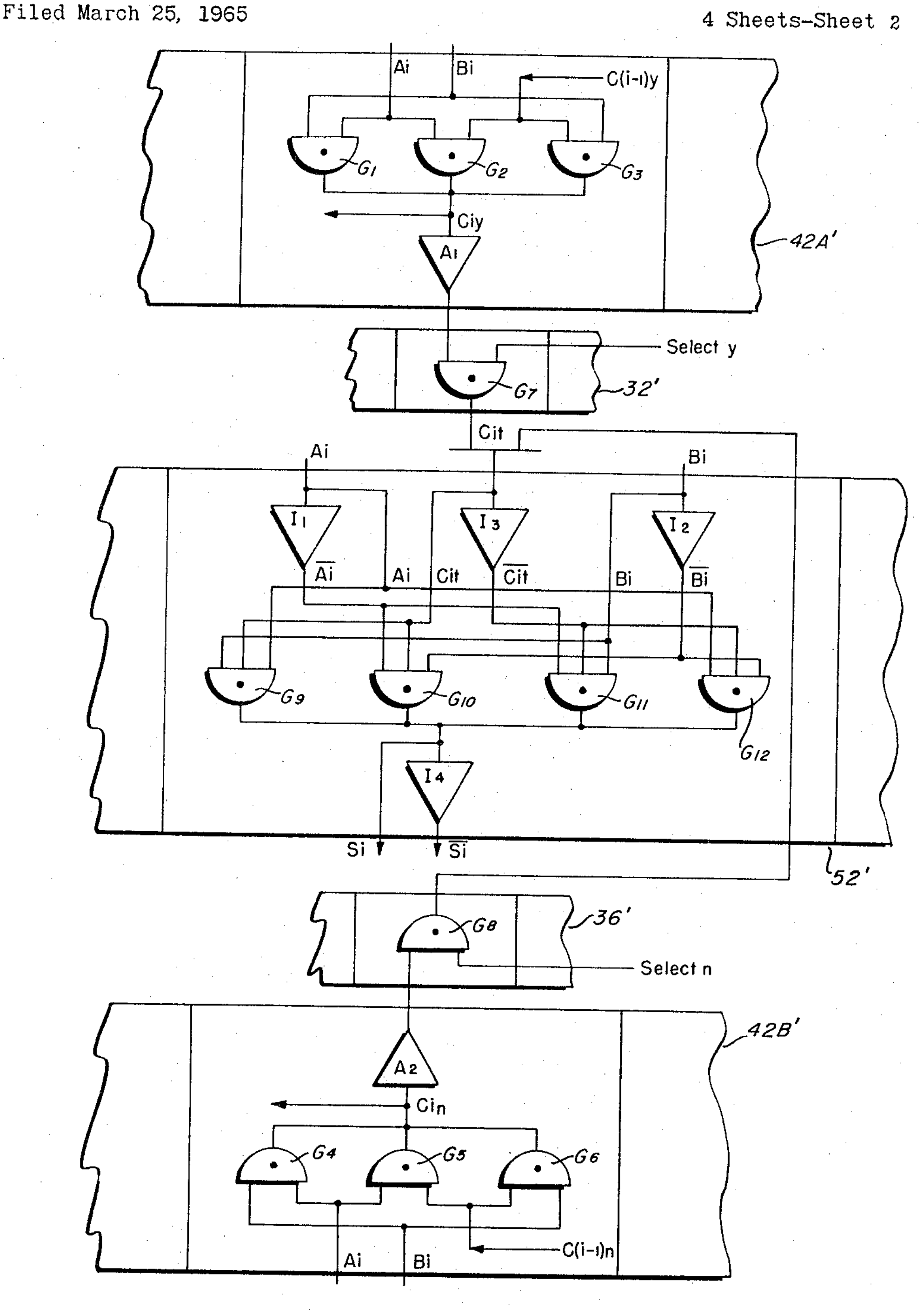
FIGURE 2 is a diagrammatic representation of the logic circuitry for the $i^{th}$ stage 3 of the adder of FIGURE 1B.

Before discussing the operation of the embodiment of FIGURE 1B, reference is made to FIGURE 2 which discloses a cross section depicting the actual logic utilized in implementing the $i^{th}$ digital position of the adder of FIGURE 1B; further assuming for purposes of simplicity, that the $i^{th}$ digital position corresponds with bit position 5 of a six-bit operand.

Referring particularly to portion 42A′ of FIGURE 2, therein is shown a single stage of the carry logic of FIGURE 1B including a plurality of AND gates $G_1$ through $G_3$. Included therein are signals $A_i$, $B_i$, $C_{(i-1)_y}$ representing respectively the $i^{th}$ bit position of the A and B operands and a conditional carry from the $i$–1 stage of this portion of the carry logic generated on the assumption that a carry was propagated into the lowest order digital position thereof. As shown, these signals are selectively paired as inputs to the gates $G_1$ through $G_3$. The conditioning of any one of the AND gate $G_1$ through $G_3$ is sufficient to buffer a signal $C_{i_y}$ through the input of an associated amplifier $A_1$. The signal $C_{i_y}$ may be interpreted as a carry out of the $i^{th}$ digital position upon the assumption that a carry was propagated into the lowermost digital position of that group. The signal $C_{i_y}$ is also forwarded as an input to the logic comprising the next succeeding digital position.

Referring now to the lowermost portion of FIGURE 2, and in particular to portion 42B′, therein is disclosed analogous logic to that described above with respect to portion 42A′. Included in 42B′ are AND gates $G_4$, $G_5$ and $G_6$ conditioned by signals representing the $i^{th}$ bit positions of the A and B operands as well as the carry signal $C_{(i-1)_n}$. The carry signal $C_{(i-1)_n}$ represents a carry out of the immediately preceding digital position as produced on the assumption that there was no carry into the lowermost digital position of the group. As with respect to the AND gates of portion 42A′, the conditioning of either of the AND gates $G_4$, $G_5$, or $G_6$ is sufficient to buffer an output signal therefrom which in turn forms he input to an amplifier $A_2$. This signal is depicted as $C_{1n}$ and represents a carry out of the $i^{th}$ portion of the assumption that no carry occurred as an input to the lowest order digital position of the group. The signal $C_{1n}$ is also carried forward as an input signal to the next succeeding digital position.

Referring back to the output of amplifier $A_1$, this signal in turn forms an input to AND gate $G_7$ of member 32'. The conditioning of AND gate $G_7$ is completed by a select signal. The select signal is, as mentioned above, indicative of the fact that either a true carry was generated in carry logic 46 and propagated through carry logic 44A; or, that no carry was propagated in carry logic 46 but that a true carry was generated in carry logic 44B. More simply, this confirms the selection of the conditional carries generated on the assumption that a carry did occur into the lowestmost digital position of portion 42A'.

In like manner, the output of amplifier $A_2$ forms one input to AND gate $G_8$ of portion 36'. The conditioning of AND gate $G_8$ is completed by a select signal. The select signal indicates either that a true carry was generated in carry logic 46 but was not propagated through carry logic 44A; or, that no carry was generated in carry logic 46 nor in carry logic 44B. The output of AND gate $G_8$ is thus indicative of a carry generated in or propagated through the $i^{th}$ stage of the carry logic 42B'.

Referring now to portion 52', it may be seen that the inputs thereto include signals representing the $i^{th}$ bit position of the A and B operands, as well as the true carry $C_{1t}$ for the $i^{th}$ bit position. Included within portion 52' are inverters $I_1$, $I_2$, and $I_3$ associated with the respective input signals $A_i$, $B_i$, and $C_{1t}$. It is the nature of the inverters to provide an output signal inverse to its input. Thus, with $A_i$ equal to a binary 1, that is $A_i$ being true, the output of the inverter $I_1$ will be zero. In this instance, the output of the inverter $I_1$, which normally represents the signal $\overline{A_i}$, will be false thus corresponding with the fact the signal $A_i$ is now true. The signals $A_i$, $\overline{A_i}$, $B_i$, $\overline{B_i}$, $C_{1t}$ and $\overline{C_{1t}}$ are selectively combined as inputs to further AND gates $G_9$, $G_{10}$, $G_{11}$ and $G_{12}$. The satisfying of all the conditional inputs to any one of the gates $G_9$, $G_{10}$, $G_{11}$ or $G_{12}$ is effective in generating an output therefrom which in turn is buffered to the input of an inverter $I_4$. As indicated above, the presence of a signal to the input of inverter $I_4$, makes the output thereof go down, thus indicating that condition $\overline{S_i}$ is false. This condition is compatible with the fact that signal $S_i$ is now true, thus representing the occurrence of the binary 1 in the $i^{th}$ bit position of the sum.

The overall portion of the apparatus disclosed in FIGURES 1B and 2 is considered next. It is first assumed that two six bit operands $A_{6-1}$, $B_{6-1}$ are to be added together; accordingly, signals representative thereof are gated to the corresponding input terminals of the carry logic portions 42A and B, 44A and B, and 46 via the indicated input leads. The initiation of the addition operation may be synchronized by timing signals directed to each of the logic portions from an appropriate source of timing signals, not shown.

Assuming no end-around carry $C_0$ to the input of carry logic portion 46, during time cycle 1 the corresponding low order bits of the A and B operands are combined in logic circuitry equivalent to that of portion 42A' of FIGURE 2. This logical combination occurs simultaneously with similar logical combinations occurring in the low order bit positions of logic portions 44A and B, and 42A and B. As noted above, the logical combinations in portions 44A and 42A proceed with an assumed carry propagated thereto. In a similar manner, a no-carry condition has been assumed as an input to the low order bit position of logic portions 42B and 44B. These latter operations are also effected in logical circuitry equivalent to that disclosed in portions 42A' and B' of FIGURE 2. As the results of the carry generation operation are being readied for transfer from the carry logic portion 46, and during the actual transfer thereof, the logical combination of the second low order bit positions of carry logic portions 42A and B and 44A and B proceeds in synchronism therewith. As the signal from carry logic portion 46 arrives at one or the other of the gating members 18 or 20 of FIGURE 1B which are logically equivalent to members 32' and 36' of FIGURE 2, signals representing carry conditions for the second and third low order bits of the A and B operands are transferred thereto from logic portions 44A and B. The conditioning of gating means 18 or 20, as effected by the true carry out of logic portion 46, is effective in gating one or the other of the conditional carries from logic portions 44A and B as inputs to the sum logic of member 50, the logical equivalent of the latter being depicted in greater detail in member 52' of FIGURE 2. The carry signals alternatively gated through member 18 or 20 are thereafter combined with corresponding A and B operand bit signals to produce the proper sum bits.

Somewhat simultaneous with the above-described action, the carry out of the logic portion 46 is combined with the low order A and B operand bits in sum logic 48 to produce the corresponding sum bit therefor. Also effected somewhat simultaneous with these latter two actions is the conditioning of one of the AND gates 24, 26, 28 or 30 in accordance with the nature of the conditional carry generated in logic portions 44A and B in light of the true carry as generated in logic portion 46. The conditioning of one of these latter AND gates is effective in generating a gating signal therefrom to the input of further AND gates 32 or 36. An input to AND gate 32 indicates that either a true carry was generated in carry logic 46 and propagated through carry logic 44A or that no carry was generated in carry logic 46 but a carry was generated in carry logic 44B. In a somewhat similar manner, an input signal to AND gate 36 indicates that either a true carry was generated in carry logic 46 but was not propagated through carry logic 44A, or that no carry was generated in carry logic 46 and no carry was generated or propagated through carry logic 44B.

Somewhat simultaneous with the generation of the alternative gating signals to AND gates 32 or 36, there occurs the generation of the conditional carries for the high order bit positions of carry logic portions 42A and B. Accordingly, signals indicative of the conditional carries for the three bit positions thereof arrive simultaneously to the inputs of AND gate 32 whereafter the selected carries are transferred as true carries to be combined in the sum logic of member 52 with the corresponding A and B operand bits to produce the proper sum bits.

In accordance with the projected use of the embodiment of FIGURE 1B as the adder of a character-oriented arithmetic unit, provisions are made to select the proper conditional carry out of logic portions 42A or B and to return this signal in a delayed fashion to the input of logic portion 46 as signal $C_0$ to be utilized in the addition of the succeeding characters. When all the sum bits for a particular pair of characters have been generated, they may be simultaneously gated out of members 48, 50 and 52 in a parallel manner on the outputs provided; or alternatively, they may be gated out serially by gating means not specifically shown but indicated generally by the arrow emanating from registers 16 and 48 of FIGURES 1A and B and their associated registers.

Figure 3:
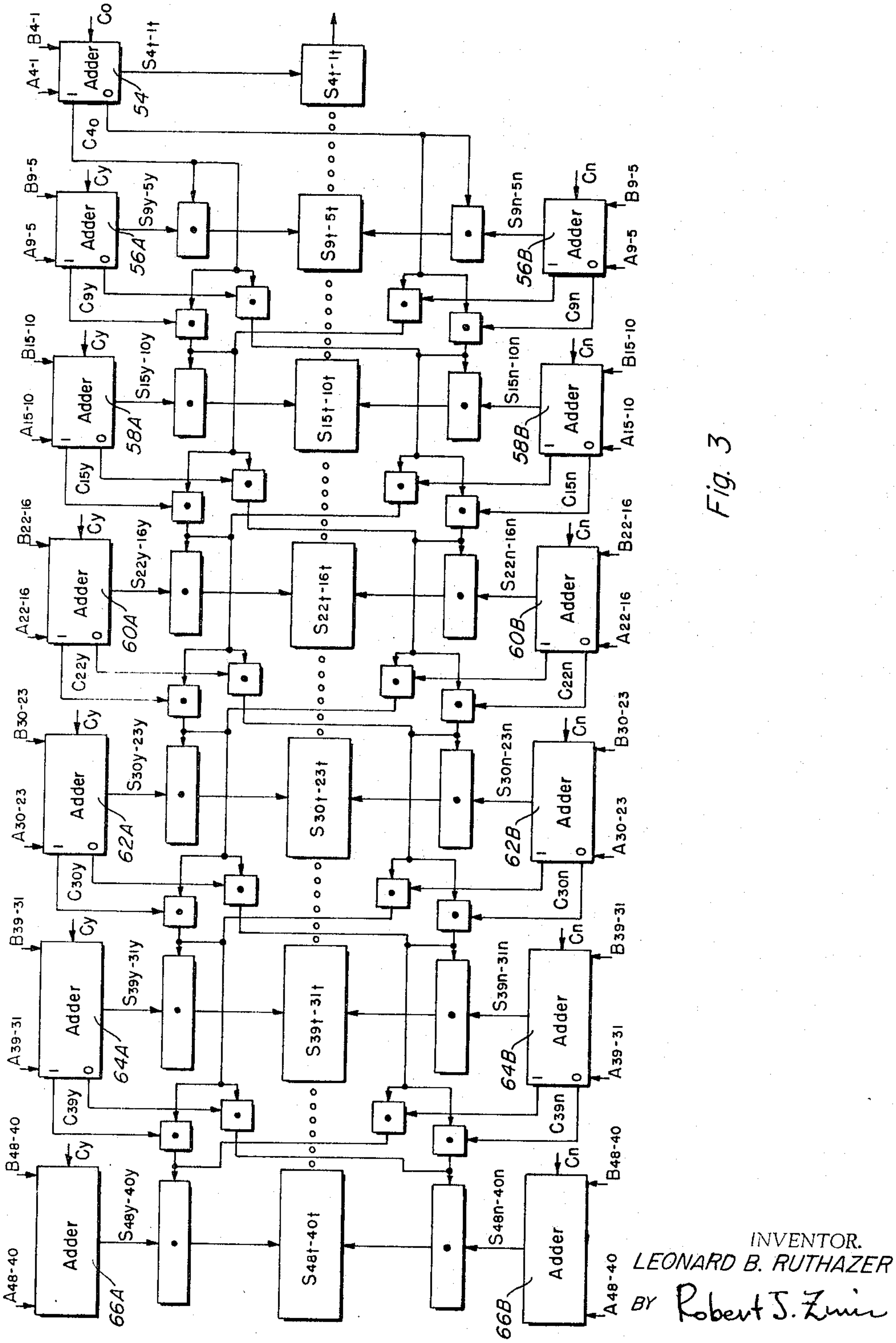
FIGURE 3 is a diagrammatic representation of an alternative embodiment of the digital computing apparatus disclosed in FIGURE 1A.

Referring now to FIGURE 3, therein is disclosed an alternative embodiment of an adder incorporating the novel features of the present invention, which adder is adapted to effect the parallel addition of two 48-digit operands. In terms of logical organization and mode of operation, the embodiments of FIGURES 1A and 3 are identical, and therefore a detailed explanation of the operation need not be given; however, it should be noted that in the organization of the adder of FIGURE 1A, the unpaired adder portion is designed to accommodate a single digit of operands A and B. In contrast, the unpaired adder portion 54 of the embodiment of FIGURE 3, accommodates digital positions 1 through 4 of the A and B operands. In this embodiment, advantage is taken of a grouped type of conditional sum adder which, when combined with the principles of the present invention, provides a conditional sum adder capable of an operating speed and degree of efficiency not heretofore available in any prior art device.

In further contrasting the embodiments of FIGURES 1A and 3, it should be noted that, whereas in the embodiment of FIGURE 1A the number of digital positions in adjacent ones of the paired and unpaired adders increases in the direction of digits of increased numerical significance, the embodiment of FIGURE 3 indicates this rule to be a general but not absolute one. More specifically, the adjacent paired adders 56A and B, 58A and B, 60A and B, 62A and B, 64A and B, and the unpaired adder portion 54 are seen to observe this same general relationship; however, the number of digital positions in the paired adder portions 64A and B are equal to the number in the paired adder portions 66A and B. The allocation of digital positions to the respective adder portions disclosed in the embodiment of FIGURE 3, is effected so as to accommodate operands corresponding to a conventional word length. It is thus apparent that in practicing the principles of the present invention, the inherent advantage associated therewith will only be realized in situations where the number of digital positions in paired adder portions differs from the number of digital positions in the immediately succeeding paired adders by a number which, when translated into terms of time, is equal to the time required to effect the selection of conditional sums and carries in paired adder portions, on the basis of the true carry signal as propagated thereto from the immediately preceding paired adders, added to the time required to forward an indication of the correct carry condition to the immediately succeeding paired adder portions.

In this respect, the worst case of a carry propagation time *tp* in a conventional group-type of conditional sum adder may be expressed as:

$$tp=ntc+ktg \qquad \text{(Equation 1)}$$

where *tc* is the time necessary to propagate a carry through one stage of a group of *n* stages, *k* is the number of groups and *tg* is the intergroup propogation time. In words, this equation states that for a pair of operands initially divided into *k* equal length digital groups of *n* stages each, the worst time required to propagate a carry therethrough is equal to the time required to propagate a carry through one digital position multiplied by the number of digital positions per group plus the time required to propagate an indication of the carry condition from group to group multiplied by the total number of groups.

It is readily appreciated that the intergroup propagation time may amount to an appreciable portion of the total time required to effect the addition cycle. In contrast, in a system implemented in accordance with the principles of the present invention wherein the digits representing the respective operands are separated into a plurality of uneven groups in the manner disclosed, the carry propagation time may be expressed as:

$$tp'=n'tc \qquad \text{(Equation 2)}$$

Here, *tc* again is an expression of the propagation time per digital position while *n'* represents the number of stages in the last group.

It should be readily apparent that the above Equations 1 and 2 may not be freely equated, and that it is beyond the scope of the present explanation to substantiate by way of a rigorous proof the non-equality; $T_p > T_{p'}$; however, it is possible to appreciate on a rational basis the operative considerations which distinguish adders of the first and second type. Thus in one instance starting with corresponding bits of the two operands grouped together in equal length groups, there results a total add time arrived at in accordance with Equation 1. In contrast, an adder operative in accordance with the principles of the present invention may comprise one wherein the length of the low order digital groups corresponds with the length of the groups of the first type of adder, and wherein each succeeding group is incrementally lengthened in accordance with the time necessary to propagate the intercarry thereto from the preceding group. It follows that for an adder of the second type capable of accommodating operands of a length common to the adder of Equation 1, as the number of bits per group increases, the total number of groups required is decreased. It is the number of groups which in turn determines the number of intergroup carries which must be effected. Thus, the decrease in the number of groups required, multiplied by the intergroup propagation constant may be used as an indication of the increased operating speed of an adder of the second type.

Another way of indicating the difference in operating speed is to note that in the adder of the first type, all the conditional sums are first generated whereafter the correct sum and carries are selected during successive time intervals. In contrast, in an adder of the second type, the selection of the sum signals in a particular group of stages and the propagation of the intergroup carry therefrom is accompanied by the generation of the conditional sum and carry signals for the additional digital positions in the immediately succeeding group of stages. Another way of stating this consideration is that in the execution of an add operation in this type of adder all of the time may be considered as being spent in the generation and propagation of intragroup carries and that no additional time is required to propagate intergroup carries. This consideration is further represented by the fact that the term of Equation 1 which expresses the intergroup carry propagation time is completely absent in Equation 2. Taking into consideration the above-mentioned limitation with respect to the free equating of Equations 1 and 2, it is nevertheless apparent that improved operating efficiency is realized in a system constructed in accordance with the principles of the present invention.

Figure 4:
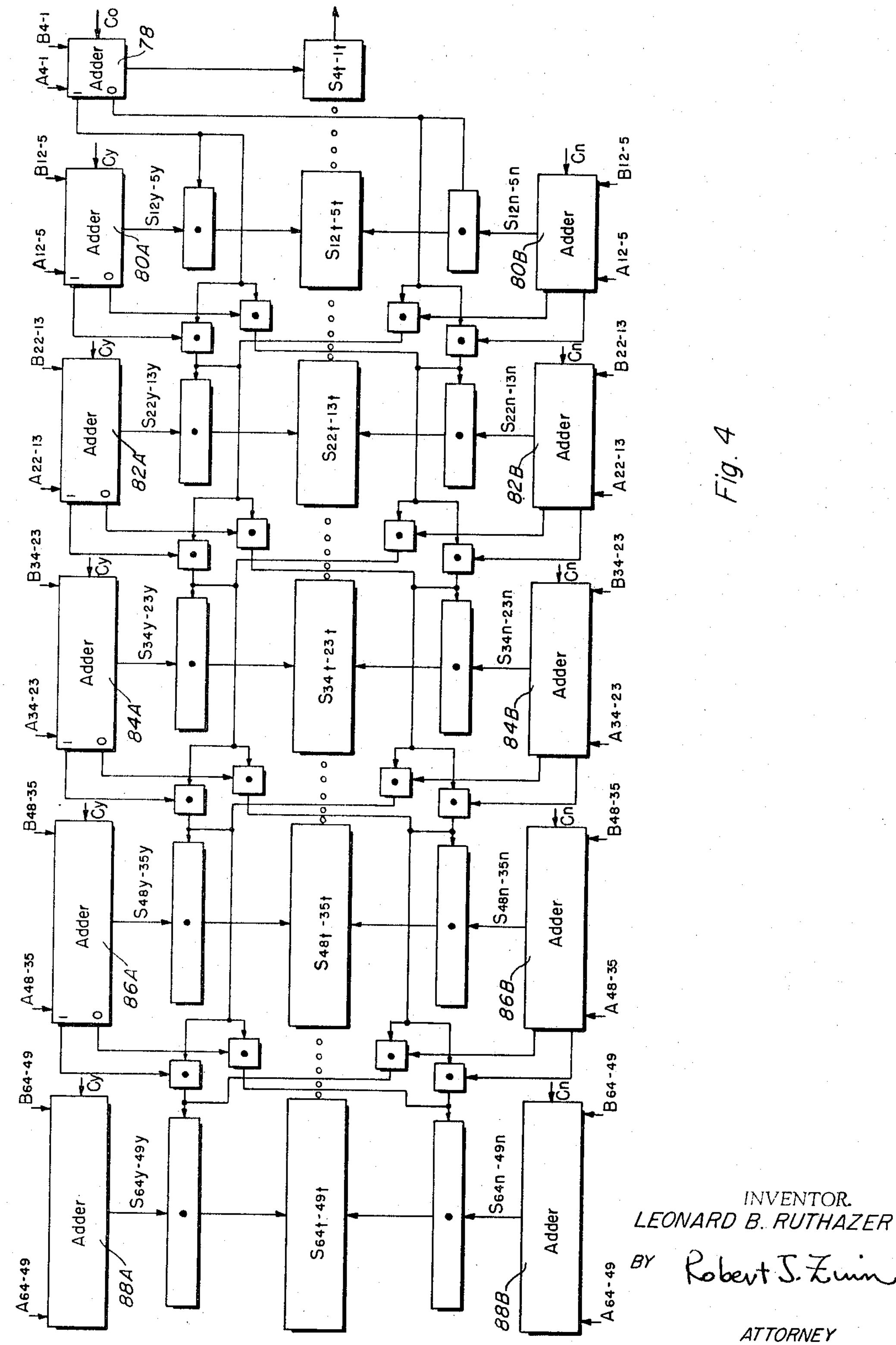
FIGURE 4 is a diagrammatic representation of another embodiment of the digital computing apparatus disclosed in FIGURES 1A and 3.

It may be that the time differential referred to above, may correspond to the time required to generate the sums and propagate carry signals through two or more full adder stages. Such a system, when constructed in accordance with the principles of the present invention and designed to accommodate operands of 64 digits, may be implemented in the manner disclosed in FIGURE 4. In this respect, FIGURE 4 discloses an apparatus for effecting the addition of two 64-digit operands wherein the digital positions of the addend $A_{64-1}$, the augend $B_{64-1}$, and the sum $S_{64t-1t}$ are divided into six unequal groups. In this particular embodiment, the bit differential between successive ones of the paired adders 80A and B, 82A and B, 84A and B, 86A and B, and 88A and B, is disclosed as the time required to propagate sum and carry signals through two full adder stages. As indicated above, this digital difference between successive paired adders is arrived at by way of a time study which takes into consideration the operating speed of the logic circuits utilized in the particular design.

It should be appreciated that the number of digital positions per adder portion as herein embodied is merely illustrative of typical implementations and that this number as well as the digital difference between successive adder portions may be changed to meet any desired requirement. Thus, while in accordance with the provisions of the statute, the best forms of the invention known have been illustrated and described, it should be apparent that changes may be made in the apparatus without departing from the spirit of the invention as set forth in the appended claims and that, in some cases, certain features of the invention may be used with advantage without a corresponding use of other features.

Having now described the invention, what is claimed as new is:

1. A digital computing apparatus comprising a plurality of paired multi-stage logic portions, said plurality of multi-stage logic portions being further characterized in that the number of stages of each pair differs from the number of stages in adjacent pairs, an unpaired logic portion, inputs connected to each of said logic portions for representing respective bit positions of operands to be manipulated therein, means for forcing a carry into the lowermost bit position of one logic portion of each of said paired logic portions, output means connected to each of said paired logic portions for representing conditional values generated therein, and means operatively connected with each of said paired logic portions to effect the selection of one or the other of said conditional values associated therewith.

2. In a digital computing network the combination comprising a plurality of paired muti-stage logic portions, an unpaired logic portion, input signal means connected to respective digital positions of each of said logic portions representing respective digital positions of augend and addend operands and wherein the lowest order digital positions of said operands are associated with said unpaired logic portion, said plurality of paired logic portions being further chracterized in that the number of digital positions therein increases with digits of increased numerical significance, means operatively connected with one logic portion of each of said paired logic portions for forcing a carry into the low order digital position thereof, output means operatively connected to each of said logic portions for representing the conditional values generated in each of said plurality of multi-stage logic portions, and means actuated upon the generation of a true carry signal in said unpaired logic portion to initiate the selection of one or the other of said conditional values associated with each pair of said plurality of logic portions.

3. In an adder of the conditional carry type wherein input signals corresponding to each pair of digits of addend and augend operands are logically combined to produce an intermediate carry first on the assumption that a carry was propagated from the immediately preceding digital position and second on the assumption that no carry was propagated from the immediately preceding digital position whereafter the selection of the appropriate one of the two conditional carries is effected in accordance with the nature of the true carry actually propagated from the preceding digital position, the combination comprising, a plurality of paired multi-stage logic portions further characterized in that the number of stages of each of said paired logic portions differs from the number of stages in the immediately adjacent paired logic portions, means for forcing the carry into the lowermost stage of one logic portion in each of said plurality of paired logic portions, an unpaired logic portion, inputs connected to each stage of said logic portions for representing respective digital positions of addend and augend operands to be added therein, output means connected to each of said paired logic portions for representing conditional values generated therein, and means operatively connected with each of said paired logic portions and responsive to the generation of a true carry in said unpaired logic portion to effect the selection of one or the other of said conditional values associated with each of said paired logic portions.

4. A digital computing apparatus comprising means for respectively producing a plurality of paired co-existent electrical signals, each of said paired signals representing two conditional carry quantities generated from corresponding addend and augend digits, said plurality of paired co-existent electrical signals being grouped in logical relationship with one another such that the number of paired co-existent electrical signals in a group differs from the number of paired-coexistent electrical signals in other groups, a plurality of sum logic stages, said sum logic grouped in a manner corresponding to the grouped relationship of said paired co-existent logical signals, means connecting said signals representing said paired conditional carries to the input of said corresponding sum logic, and means for alternatively gating one or the other of said pair of co-existent electrical signals as inputs to said sum logic in combination with corresponding addend and augend input signals to thereby generate the resultant sum.

5. In a digital computer network the combination comprising a plurality of paired multi-stage adders, an unpaired adder portion, input signal means connected to respective digital positions of each of said adders representing respective digital positions of augend and addend operands and wherein the lowest order digital positions of said operands are associated with said unpaired adder portion, said plurality of paired adders being further characterized in that the number of digital positions therein increase with digits of increased numerical significance, means operatively connected with one adder of each pair of said plurality of paired adders for forcing a carry into the low order digital position thereof, and output signal means operatively connected to each of said paired adders for representing the conditional sums and carries generated in each of said plurality of multi-stage adders, and means actuated upon the generation of true sum and carry signals in said unpaired adder portion to initiate the selection of one or the other of said conditonal sums and carries associated with each of said plurality of paired adders, said combination further characterized in that the time required to generate said conditional sums and carries in one of said paired adders as well as to forward an indication of the selected one thereof is made in accordance with the propagation of the carry from the preceding paired adders does so in the time it takes to generate the conditional sums and carries in the immediately succeeding paired adders.

6. An electrical digital computer network comprising means for respectively producing a pluraltiy of paired co-existent electrical signals, each of said paired signals representing two conditional sum and carry quantities generated from corresponding addend and augend digits, said means further comprising a plurality of paired multi-stage adders which adders are further characterized in that the number of corresponding stages in each adder is related to the number of stages in the succeeding adders in the manner of an increasing arithmetic progression, and means operatively connected with each of said paired adders to effect the alternative selection of one or the other of said paired electrical signals.

7. In an adder of the conditional sum type wherein signals representing corresponding pairs of digits of the addend and augend operands are separated into groups and added to produce conditional sums and carries first on the assumption that a carry was propagated into the low order digital position of each group from the preceding group and second on the assumption that no carry was propagated into the low order digital position thereof whereafter the selection of the appropriate conditional sums and carries is effected in accordance with whether a carry from the preceding group actually occurred, the combination comprising, a plurality of paired multi-stage adders which adders are further characterized in that the number of stages of each of said paired adders differs from the number of stages in the immediately preceding and succeeding ones of said paired adders, input means connected to said plurality of paired adders for supplying thereto input signals representing said grouped digits of said addend and augend operands, said plurality of paired adders further provided with output means for representing said conditional sums, and means operatively connected with each of said paired adders to effect the selection of either said first or second conditional sum associated therewith.

8. In a digital adder of the conditional sum type the combination comprising a plurality of paired multi-stage adders, which adders are further characterized in that the number of stages of said paired adders is greater than the number of stages in the immediately preceding adder pair, an unpaired adder, inputs connected to each of said adders for representing respective digital positions of addend and augend operands to be added therein, means for forcing a carry into the lowermost digital position of one adder of each of said adder pairs, output means connected to each of said paired adders for representing conditional sums and carries generated therein, and means operatively connected with each of said paired adders to effect the selection of one or the other of said conditional sums associated therewith.

9. In a digital adder of the conditional sum type wherein signals representing corresponding pairs of digits of addend and augend operands are separated into groups and added first on the assumption that a carry was propagated into the low order digital position of each group from the preceding group and second on the assumption that no carry was propagated into the low order digital position thereof whereafter the selection of the appropriate conditional sums and carries is effected in accordance with whether a carry from the preceding group actually occurred, the combination comprising a plurality of paired multi-stage adders which paired adders are further characterized in that the number of stages of each adder portion of said paired adders is greater than the number of stages of each adder portion in the immediately preceding paired adders, a source operatively connected to respective digital positions of said plurality of paired adders to provide signals representative of said grouped digits of said addend and augend operands, means for forcing a carry signal into the lowermost stage of each of said adder portions of said paired adders, output means connected to each of said adder portions for representing the conditional sums and carries generated therein, and means operatively connected with each of said paired adders to effect the selection of one or the other of said conditional sums associated with the adder portions of each of said paired adders.

10. A digital computer network comprising means for respectively producing a plurality of paired co-existent electrical signals, each of said paired signals representing two conditional sum and carry quantities generated from corresponding addend and augend digits, said means further comprising a plurality of paired multi-stage adders which adders are further characterized in that the number of stages included in succeeding ones of said paired adders is greater than the number of stages in the preceding paired adders, an unpaired adder, and means operatively connected with each of said paired adders responsive to the generation of a true carry in said unpaired adder to effect the alternative selection of one or the other of said conditional sum and carry quantities associated with each pair of said multi-stage adders.

11. An apparatus for the addition of multi-digit operands comprising first multi-position adders including input signals to each position thereof representing corresponding digits of said multi-digit operands, at least one of said first multi-position adders having a carry propagated into low order digital position thereof, second multi-position adders including input signals to each position thereof representing higher order ones of said digital positions of said multi-digit operands, at least one of said second multi-position adders having a carry propagated into the low order position thereof, said first and second multi-position adders being further distinguishable in that the number of digits accommodated by said second multi-digit adders is greater than the number accommodated in said first multi-position adders, output means connected to each of said multi-position adders for representing conditional results generated therein, and means operatively connected with each of said first and second multi-position adders to effect the selection of one of the conditional sums associated therewith.

12. A digital computing apparatus comprising a plurality of paired multi-position adders, an unpaired adder, input signals connected to respective digital positions of each of said adders for representing augend and addend operands wherein the lowest order digital positions of said operands are associated with the inputs of said unpaired adder, successive ones of said plurality of paired adders being further characterized in that the number of digital positions therein increases with the increase in digital positions being associated with the adder pair having associated therewith digital positions of increased numerical significance, means associated with one adder of each pair of said plurality of paired adders for forcing a carry into the lower order digital position thereof, output signal means operatively connected to each of said paired adders for representing the conditional sums and carries generated in each of said plurality of multi-position adders, and means actuated upon the generation of true sum and carry signals in said unpaired adder and connected to initiate the selection of one or the other of said conditional sums and carries associated with each of said plurality of paired adders.

13. In an adder of the conditional sum type wherein input signals corresponding to each pair of digits of addend and augend operands are added to produce an intermediate sum and carry first on the assumption that a carry was propagated from the immediately preceding digital position and second on the assumption that no carry was propagated from the immediately preceding digital position whereafter the selection of the appropriate one of the two conditional sums is effected in accordance with the nature of the true carry actually propagated from the preceding digital position, the combination comprising, a plurality of paired multi-stage adders which are further characterized in that the number of stages of said paired adders differs from the number of stages in the immediately preceding and succeeding ones of said paired adders, means for forcing a carry into the lowermost stage of one adder portion of each of said plurality of paired adders, an unpaired adder portion, inputs connected to each stage of said adder portions for representing respective digital positions of addend and augend operands to be added therein, output means connected to each of said paired adder portions for representing intermediate sums and carries generated therein, and means operatively connected with each of said paired adders and responsive to the generation of a true carry in said unpaired adder portion to effect the selection of one or the other of said intermediate sums associated with each of said adder portions of said plurality of paired adders.

References Cited by the Examiner

UNITED STATES PATENTS

| | | | |
|---|---|---|---|
| 2,952,407 | 9/1960 | Weiss et al. | 235—175 |
| 3,100,835 | 8/1963 | Bedrij | 235—175 |
| 3,100,836 | 8/1963 | Paul et al. | 235—175 |
| 3,198,939 | 8/1965 | Helbig et al. | 235—175 |
| 3,202,806 | 8/1965 | Menne | 235—175 |
| 3,230,354 | 1/1966 | Wagner | 235—164 |

MALCOLM A. MORRISON, *Primary Examiner.*

M. J. SPIVAK, *Assistant Examiner.*